US009442745B2

(12) United States Patent
Xia et al.

(10) Patent No.: US 9,442,745 B2
(45) Date of Patent: Sep. 13, 2016

(54) BUSINESS-TO-CONSUMER EXTENDABLE BASE APPLICATION

(71) Applicant: SAP SE, Walldorf (DE)

(72) Inventors: Steven Qian Xia, Singapore (SG); Yean Fee Ho, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 105 days.

(21) Appl. No.: 14/014,900

(22) Filed: Aug. 30, 2013

(65) Prior Publication Data

US 2015/0067638 A1    Mar. 5, 2015

(51) Int. Cl.
*G06F 9/44*     (2006.01)
*G06F 9/445*    (2006.01)
*G06F 9/54*     (2006.01)
*G06Q 30/06*    (2012.01)

(52) U.S. Cl.
CPC ........... *G06F 9/44505* (2013.01); *G06F 9/542* (2013.01); *G06F 8/30* (2013.01); *G06F 9/44526* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 5,933,645 A * | 8/1999 | Wallack ................ | G06F 9/542 707/999.001 |
| 6,237,135 B1 * | 5/2001 | Timbol ........................ | 717/107 |
| 6,876,733 B2 * | 4/2005 | Creamer .............. | H04Q 3/0058 379/201.12 |
| 7,992,132 B2 * | 8/2011 | Fernando et al. ............ | 717/120 |
| 8,412,813 B2 * | 4/2013 | Carlson et al. ............... | 709/224 |
| 8,589,955 B2 * | 11/2013 | Roundtree et al. ........... | 719/328 |
| 8,832,675 B1 * | 9/2014 | Abderrazzaq ....... | G06F 9/44505 717/169 |
| 2004/0105537 A1 * | 6/2004 | Creamer .............. | H04Q 3/0058 379/221.08 |
| 2006/0136933 A1 * | 6/2006 | Jensen .................... | G06F 9/542 719/318 |
| 2006/0161672 A1 * | 7/2006 | Jolley ..................... | G06F 9/542 709/230 |
| 2006/0265688 A1 * | 11/2006 | Carlson et al. ............... | 717/101 |
| 2007/0198993 A1 * | 8/2007 | Zhang ..................... | G06F 9/542 719/318 |
| 2008/0222617 A1 * | 9/2008 | Fernando et al. ............ | 717/139 |
| 2009/0125419 A1 * | 5/2009 | Barney .............. | G06Q 30/0601 705/26.1 |
| 2009/0254912 A1 * | 10/2009 | Roundtree et al. ........... | 718/102 |
| 2010/0313029 A1 * | 12/2010 | Abeln ................. | G06F 9/44526 713/176 |
| 2011/0208788 A1 * | 8/2011 | Heller ....................... | G06F 8/30 707/810 |

OTHER PUBLICATIONS

Birsan, D., On Plug-ins and Extensible Archictectures, Queue Magazine, vol. 3 Issue 2, Mar. 2005, pp. 40-46, [retrieved on Jul. 20, 2016], Retrieved from the Internet: <URL:http://dl.acm.org/>.*

Hudson, S., et al., Extensible Input Handling in the subArctic Toolkit, Proceedings of the SIGCHI Conference on Human Factors in Computing Systems, 2005, pp. 381-390, [retrieved on Jul. 20, 2016], Retrieved from the Internet: <URL:http://dl.acm.org/>.*

* cited by examiner

Primary Examiner — Thuy Dao
Assistant Examiner — Geoffrey St Leger
(74) Attorney, Agent, or Firm — Jones Day

(57) ABSTRACT

Techniques are presented herein to enable the storing of a base application. A plurality of program modules are stored with the base application, where the plurality of program modules comprise a first module and second module. User instructions are received to form a configuration file containing interaction rules, wherein the interaction rules define, for the base application, how the first module interacts with the second module to form a configured first module. The base application is then executed along with the configured first module on behalf of a user.

22 Claims, 12 Drawing Sheets

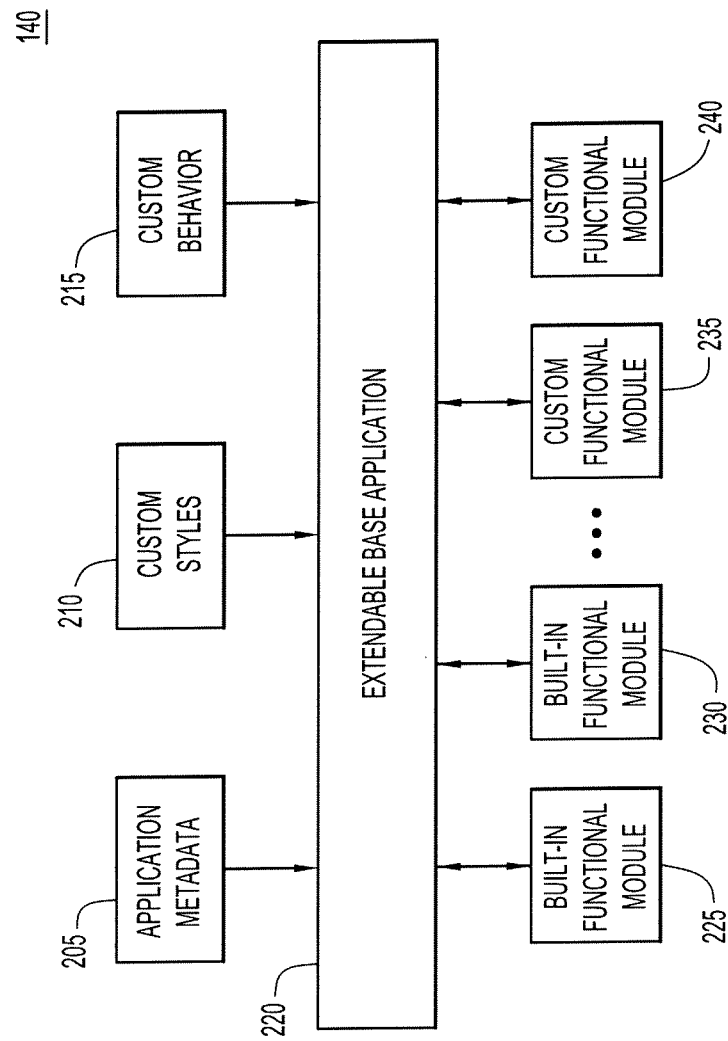

205

```
<MyApp Type="Shopping" Name="TestShopping" HomeScreen="HotDeals">
<Components>

<Component type="Deal" Name="HotDeals" Title="Hot Deals" Icon="images/Dollar.png">
<SpecialAttributes Style="app/layout/DealsLayout.xml" DiscountPicture="True"
 BetterDeal="True"
Adapter="MyAppPromotionsData" Filter="Default"/>
</Component>

<Component type="Catalog" Name="Catalog" Title="Browse"
Icon="images/search.png">
<SpecialAttributes Style="app/layout/CatelogLayout.xml" DiscountPicture="True"
 BetterDeal="True" BackButton="False"
BarCode="False" Search="False" Adapter="MyAppCatalogData" Sort="None"
 Filter="None"/>

</Component>
<Component type="ShoppingCart" Name="ShoppingCart" Title="ShoppingList
" Icon="images/shop2.png">
<SpecialAttributes Style="Default"
LayoutConfig="app/layout/ShoppingCartLayout.xml" TotalSaving="True"
ProductPicture="True" DiscountInfo="True" BetterDeal="True"
Adapter="MyAppShoppingData" Sort="" />
</Component>

<Component type="StoreLocator" Name="StoreLocator" Title="Stores"
Icon="images/globe2.png">
<SpecialAttributes Style="app/layout/StoreLocatorLayout.xml"
 Adapter="MyAppStoreData"/>
</Component>
</Components>
</MyApp>
```

FIG.3

```
...
.category_name {
font-size: 14px;
font-weight: bold;
color: #222222;
text-shadow: 0px 2px 1px #ffffff;
text-align: left;
text-overflow: ellipsis;
white-space: nowrap;
}
.category_desc {
font-size: 10px;
text-align: left;
text-overflow: ellipsis;
white-space: nowrap;
color: #222222;
}
.product_list {
font-size:16px;
font-family:Verdana;
text-align:left;
text-shadow: rgba(0, 0, 0, 0.4) 0px -1px 0;
color:#202020;
}
.product_name {
font-size:12px;
font-family:Verdana;
text-align:left;
color:#000000;
}
.product_name_detail {
font-size:14px;
font-family:Verdana;
text-align:left;
color:#222222;
text-shadow: 0px 2px 1px #ffffff;
}
...
```

BUSINESS-TO-CONSUMER EXTENDABLE BASE APPLICATION

TECHNICAL FIELD

The present disclosure relates to extendable applications.

BACKGROUND

Mobile devices, smart phones, tablet PCs and other portable and web-enabled devices have become widespread, and are used by businesses and consumers in an increasing variety of ways. With the burgeoning use of these devices, there is a corresponding increase in demand for software applications that execute on these devices.

Development of such applications can be time-consuming, complex and expensive. Typically, an application developer requires specialized training to learn advanced programming techniques. Web applications in particular are often composed of multiple programming languages, complicating application development and maintenance still further. This typically results in expensive barriers to entry for small businesses and individuals wishing to set up applications that can perform e-commerce, shopping cart, catalog, and other complex web functionality. Further, once developed, the applications cannot be easily or inexpensively maintained or modified.

BRIEF DESCRIPTION OF THE DRAWINGS

FIG. 2 is a diagram representing the structure of an extendable base application according to one embodiment.

FIG. 3 is a diagram depicting an example configuration file.

FIG. 6 depicts an example style sheet that is operable with the extendable base application.

DESCRIPTION OF EXAMPLE EMBODIMENTS

Overview

Techniques are presented herein to enable the storing of a base application. A plurality of program modules are stored with the base application, where the plurality of program modules comprise a first module and second module. User instructions are received to form a configuration file containing interaction rules, wherein the interaction rules define, for the base application, how the first module interacts with the second module to form a configured first module. The base application is then executed along with the configured first module on behalf of a user.

Example Embodiments

Figure 1:
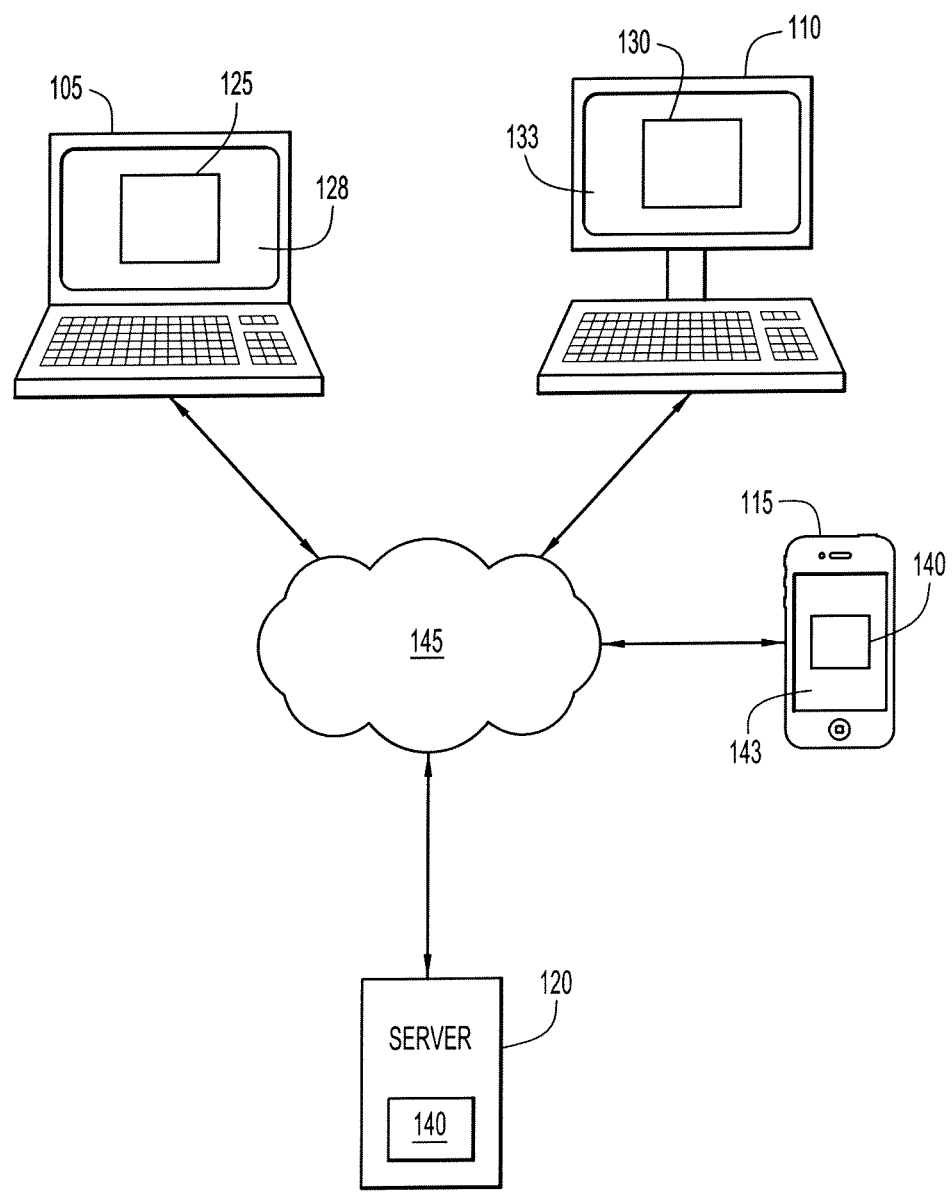
FIG. 1 is a diagram showing a variety of devices connected to a network using software applications.

Referring first to FIG. 1, several example user devices 105, 110 and 115 which can benefit from embodiments described herein are shown. The user devices 105, 110 and 115 may operate on a network 145, and may use server 120 to access the Internet or utilize web or network functionality related to the present embodiment. The user devices may be in any number and may take a variety of forms, including a desktop computer, laptop computer, mobile/cellular phone (e.g., Smartphone), tablet computer, Personal Digital Assistant (PDA), a game console, etc. The network 145 may consist of one or more wired and/or wireless local and/or wide area networks. FIG. 1 shows that the user device 115 is a cellular phone, by way of example, though the user device 115 could take any of the device forms listed above. In the example shown in FIG. 1, the user device 115 is executing an application 140 on display 143. The application 140 is similarly shown executing at 130 on display 133, and at 125 on display 128. The application 140 may be stored and executed locally, or stored and executed across network 145, or a combination thereof.

The application 140 (and likewise application 130 and 125) may be created using the Business-to-Consumer (B2C) Extendable Base Application (EBA) in accordance with embodiments described herein. As will be explained, the EBA provides a framework that is flexible, extensible, and dynamically configurable. By providing easy configuration and customization, as well as options for extension in accordance with the techniques described herein, the EBA saves resources. Specifically, the EBA lowers the expense associated with application development, requires less training for developers, provides increased developer control of the application, and lowers maintenance costs. The EBA will now be described in greater detail.

Turning now to FIG. 2 (with continued reference to FIG. 1), an EBA 220 with related features that together produce an application 140 in accordance with embodiments described herein are shown. The EBA 220 provides a flexible, extensible, and dynamically configurable default data model which an application developer may alter. The EBA 220 is also a core software module into which any number of software modules, both Built-in 225, 230 and Custom 235, 240, may be connected. Functional Modules 225-240 can be characterized as software extensions which add to or alter the default functionality of the EBA 220. The EBA 220 also has default event-handling functionality, allowing Functional Modules to register to receive notifications when a registered event occurs (is raised), as will be discussed further herein. An application developer may tweak or alter the EBA 220 through configuration entries, such as an Application Metadata configuration file 205, Custom Styles 210, or Custom Behavior 215. The EBA 220 may also support a range of data source definitions, a number of data exchange operations (read, write, etc.), and one or more repositories (databases, Extensible Markup Language (XML) files, comma separated value files, spreadsheets, etc.)

The EBA 220 can be utilized and modified in a variety of ways by an application developer to produce application 140. As mentioned previously, the EBA 220 may contain stock Built-in and Custom Functional Modules 225-240. A Functional Module may be seen as a "building block," comprising software code, logic, configuration information, user interface components, etc. Functional Modules typically offer certain functions, capabilities, services, etc. The modules can be programmed to interact with and extend the EBA 220 and with each other, either via the EBA 220, or directly. A Functional Module may generate or supply static and/or dynamic user interface elements using configuration information, application logic, Custom Behaviors 215, retrieved or received data, etc. These user interface elements may include layout, position, size, information, color, and attribute information, among other things. Application Metadata 205 may further affect the creation, use and disposal of Functional Modules 225-240, and their properties, configuration, and behavior, as will be discussed further herein.

An application developer may utilize Custom Behaviors 215 to define and customize various behaviors of the EBA 220. For example, the application developer may override default event handlers of the EBA 220, define new events and provide event handling logic that handles when these events are triggered. This event control is just one way to customize the EBA 220.

The features of Functional Modules 225-240 may be utilized, customized, and combined to form a feature-rich application, which may be used in, e.g., a mobile B2C environment. In an embodiment, each module is a discrete, stand-alone entity. The modules may be maintained in separate files using separate data stores, such as separate databases, for example. Further, modules may be able to be added or removed by a user without compilation of related software, allowing the maintenance, modification and extension of EBA 220 functionality without specialized software or knowledge of software compilation techniques.

Functional Modules 225-240 may also extend, enhance, and/or customize the EBA 220 default data model in a variety of ways. For example, the EBA 220 may be modified to accommodate specific back-end data sources and specific data structures, formats, requirements, etc., that are unique to the module.

Built-in Functional Modules 225, 230 may include, for example, a Catalog which displays information on products and services, inter alia. Other Built-in Functional Modules 225, 230 may include Deals, which monitors a retailer's ongoing deals (i.e. promotions) or special pricing, a Shopping Cart, which keeps items, products, services, etc., a user has selected in a virtual basket, and a Store Locator, which displays visual text, graphics, audio, visual information of one or more stores (locations) of a retailer. Still other Built-in modules 225, 230 may include "Home" features which are displayed when an application starts or begins. The home features may include a sign-in or log-in functionality, and links, such as links to other Built-in modules that may be available to a user, such as the Catalog, Deals, and Shopping Cart as previously mentioned. Finally, there may be a Built-in "Settings" module, through which a user may view, list, change, and save one or more settings or options associated with the present embodiment. These modules are Built-in because they are commonly or typically found in a B2C environment, and thus they expedite typical development and customization times of an application 140. Those skilled in the art will appreciate that other Built-in Functional Modules may be deployed in connecting, extending, and interacting with the EBA 220.

As mentioned previously, an application developer may add new features and/or extend existing functionality by adding or developing Custom Functional Modules (CFMs) 235-240. A CFM can leverage the configuration facilities, event facilities, and Application Programming Interfaces (APIs) of the EBA 220. A CFM manages its own data, controlling how much data is obtained (e.g. from a data source), displayed to a user, updated, and passed (e.g. to the EBA 220 or another Functional Module).

A CFM may also register with the EBA 220 to receive specific events, including events from other Functional Modules. A CFM also handles events when they arrive, and may provide data in response to the EBA 220 or another Functional Module. For example, when a user in a Catalog module clicks "Add to Cart," an event is triggered that notifies the Shopping Cart module of the event. The Shopping Cart may then process and store the information, launch, and/or provide response data.

To summarize, among other things the application developer may add to or modify the default event handlers of the EBA 220, thus altering the behavior of the B2C application 140. The developer may also modify the EBA's 220 default data model via configuration entries. Further, the developer may define a B2C application 140 through configuration entries such as Application Metadata 205, which may be XML.

Turning now to FIG. 3, an example Application Metadata configuration file 205 is shown. The configuration file 205 may define the look and feel, as well as at least partially the operation of the B2C application 140. The file 205 may have a list of common attributes defined by the EBA 220 that are the same across different Functional Modules. These common attributes include "Type," indicating the type of module, for e.g. ShoppingCart. Other attributes include "Name," which is a unique module name, "Icon," which is a location of a graphical image icon for the module, and "Adaptor," which is the name of a JavaScript or object-oriented code implementation to, among other things, obtain data from a data source, as will be discussed further. The Application Metadata configuration file 205 may also have special attributes that are unique only to a particular Functional Module. For example, a ShoppingCart object has a "DisplayStyle" attribute, wherein there are several predefined styles that each link to a metadata file that defines the look and feel of the ShoppingCart. Additional ShoppingCart special attributes are "TotalSaving," which specifies whether money saved on promotions will be displayed, "ProductPicture," which specifies whether a product picture is displayed, and "DiscountInfo," which specifies whether discount or promotion information is displayed. Further special attributes include "BetterDeal," which specifies whether to display better known promotions, and "Sort," which specifies the default sort for items displayed in the ShoppingCart. For example, the cart may be sorted by field, display name, type, and value.

The Application Metadata file 205 may include a collection of configuration entries (component nodes) defining a hypothetical application "TestShopping" that comprises a series of Functional Modules ("Deal," "Catalog," "ShoppingCart," and "StoreLocator"). The application developer can manipulate which Functional Modules are included, and the attributes within each Functional Module to affect the function, look and feel of the TestShopping application. It should be noted that the application developer is not necessarily editing the Application Metadata file 205 directly, but may be using a graphical user interface (GUI), which has the benefit of increased ease and speed of use.

For example, the MyApp node names the TestShopping application, and the "HomeScreen" attribute indicates that the "HotDeals" Functional Module, of type Deal, will be the initial screen displayed in the application. Within the HotDeals Functional Module node, the module is identified as type Deal, thus associating it with the Deal Built-in Module. The "SpecialAttributes" node is contained within each Functional Module node listed, and defines various common and special attributes that affect the appearance and functionality of the TestShopping application. For instance, the style attribute references a file which contains further layout information for the HotDeals Functional Module, which may be an XML file, and which may itself further reference a Cascading Style Sheet (CSS) that at least partially comprises Custom Styles 210 for the application 140. Other attributes might designate whether a bar code/quick response (QR) scanner will be active as a method to retrieve product information, whether a search field to search items in the Functional Module is available, and whether a picture of a product will be displayed.

One attribute in the Application Metadata configuration file 205 is the Adaptor. The Adaptor attribute indicates an Adaptor file containing functional logic, which can access a data source. For example, when a user clicks an item on the screen, functional logic in the relevant Adaptor file may be referenced. Thus, by modifying the Adaptor file, behavior of the application 140 can be further customized. The Adaptor files may define Custom Behaviors 215. As mentioned previously, the Custom Behaviors 215 may encompass customizing event handlers of the EBA 220, defining new events and providing event handling logic that handles when these events are triggered. The Adaptor file may create, access and modify data stores and other data objects, alter and manipulate the display of the associated Functional Module in application 140, and display messages to the user of application 140, inter alia. While these are listed as examples, other Custom Behaviors may be implemented as well. The Adaptor file may be coded in an object-oriented programming language, although other programming languages could be employed. The user may also modify the Adaptor file via a GUI, which allows application development to be further simplified.

As an example, the Catalog Built-in Functional Module Adaptor has at least three functions:
Browse( ) accepts a categoryID, and returns a list of items that match the categoryID.
Search( ) accepts a string, and returns products with names that match the string.
GetProduct( ) accepts a productID, and returns the details of the product from a data source defined in the Adaptor file.

If an application developer wishes to add a CFM, a node would be added to the Application Metadata configuration file 205 along with the other modules. If the new module needs a data source, an Adaptor would be provided. Further, if the new module interacts with other components, it would define event handlers.

The development of an example "TestShopping" application 140 will now be described, with reference to FIGS. 4a-4d. An application developer, to implement default behaviors utilizing only Built-in Functional Modules 225, 230, in one embodiment would provide an Application Metadata configuration file 205, which contains references to Adaptor files that obtain data from a data source for the application 140. The application developer may also write several lines of source code that loads the Application Metadata 205 and launches the application, although all of these steps may be implemented via a GUI.

The application developer may also customize the look and functionality of the TestShopping application 140. The developer may further provide custom layout files, which may be referenced in the Application Metadata file 205. The default methods in the EBA 220 may also be overridden. Existing domain objects (entries in the Application Metadata file 205 corresponding to Functional Modules) may also be extended or modified. Finally, entire custom Functional Modules 235, 240 may be added to extend the EBA 220, as discussed previously.

Figure 4A:
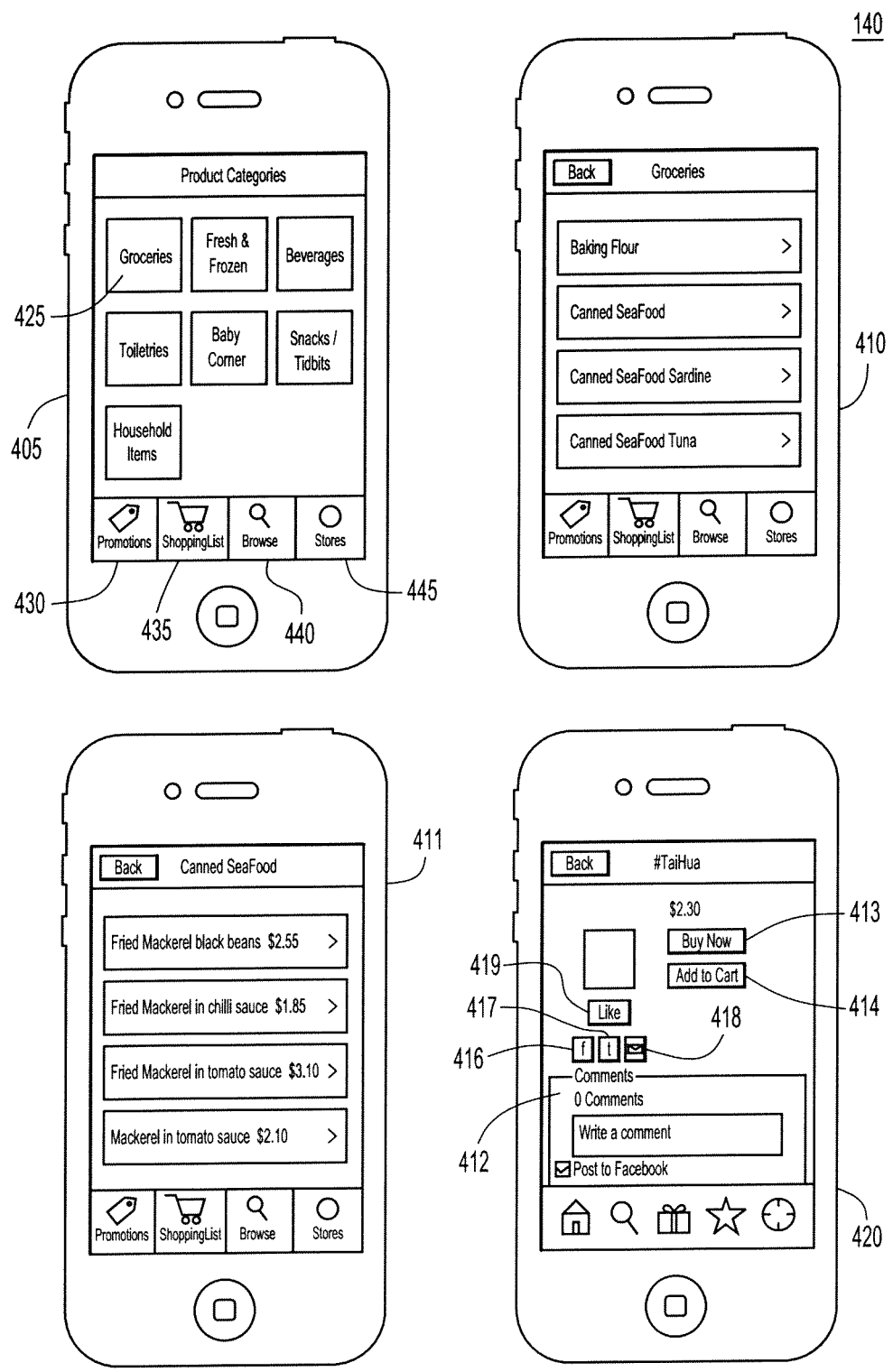
FIGS. 4a-4d depict example user interfaces according to embodiments described herein.

An example of the result of the Application Metadata 205 and Custom Behaviors 215 modifying and extending the EBA 220 and displaying several Functional Modules can be seen in FIG. 4a. The application 140 may contain tabs with icons, and in the example shown at screen 405, tabs "Promotions" 430, "Shopping" 435, "Search" 440, and "Stores" 445 are displayed for user selection. Each tab may be automatically created for each Functional Module node in the Application Metadata file 205.

At screen 405, a catalog listing is shown of various product categories 425, which may be shown in response to a user search. The user may then click on a product to show intermediate levels 410 and 411, and ultimately the product detail at 420, wherein there may be a button or indicator to add the item to a shopping cart 414 or Buy Now button or indicator 413. Screen 420 may also comprise functionality for comments 412, user "likes" 419, price, and links to social media such as Facebook 416, Twitter 417, and emailing the page 418. Typically, the name of the page is listed at the top of each display.

Figure 4B:
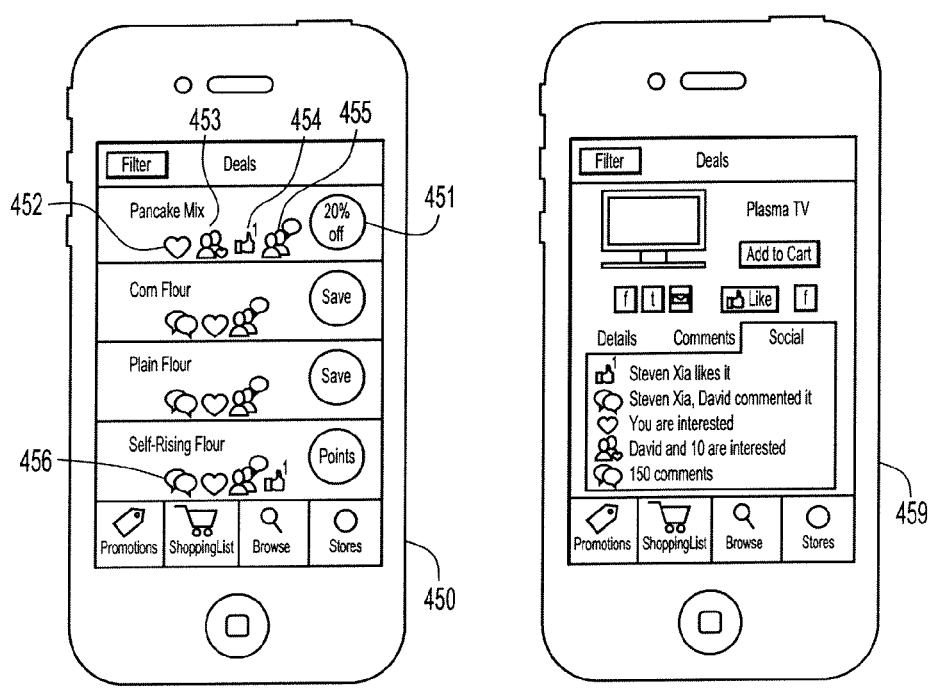

Promotions and deals are shown in FIG. 4b, corresponding to the "HotDeals" Functional Module referenced in the Application Metadata configuration file 205. Icons 451 may indicate to the user the type of deal, which may be selected to advance to the product detail screen 459. Social media badges 452-456 may indicate different types of social behavior related to a product listing. For example, badge 452 may indicate that the user has previously indicated interest, while badge 453 may indicate that others, especially a user's friends, are interested. Badge 454 may indicate that the user has liked the product on Facebook, while badge 455 may indicate that others are commenting on it. Badge 456 may indicate that people unknown to the user are commenting on the product. Many other types of social badges and indicators would be obvious to a person of ordinary skill in the art.

Figure 4C:
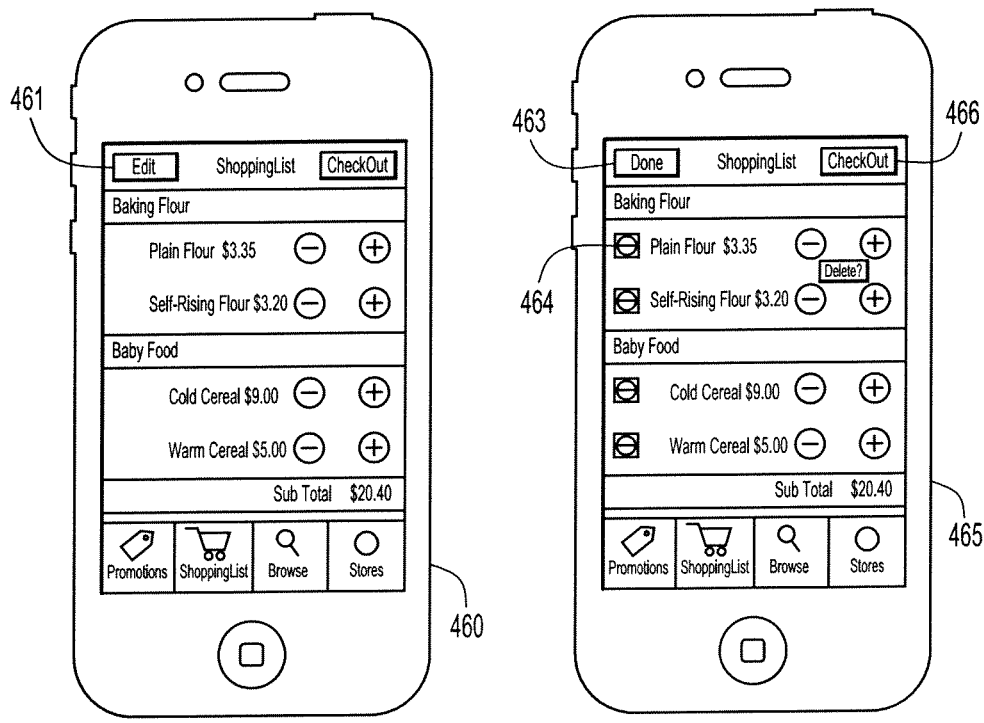

A shopping cart is shown in FIG. 4c, corresponding to the "ShoppingCart" Functional Module, and wherein a user may be able to see the items added to the shopping cart, control the number of items in the cart, and purchase items by checkout. The items may be grouped by category, and the number of items may be displayed on the tab on the lower portion of the screen. If the user wishes to remove one or more items, "Edit" button 461 may be selected, which then causes removal buttons 464 to appear next to each item in the cart. The user may select a removal button 464 to remove an item. Once the desired items have been removed, the user may select the "Done" button 463 to return to screen 460. If the user selects the "Checkout" button 466, the event for Checkout is fired, and a configuration page may be displayed. The EBA 220 may provide a Checkout Built-in Module to handle this event, or the application developer may override to handle this event in a custom manner. If the user selects "Continue" on the confirmation page, the user will be taken to a custom payment page.

Figure 4D:
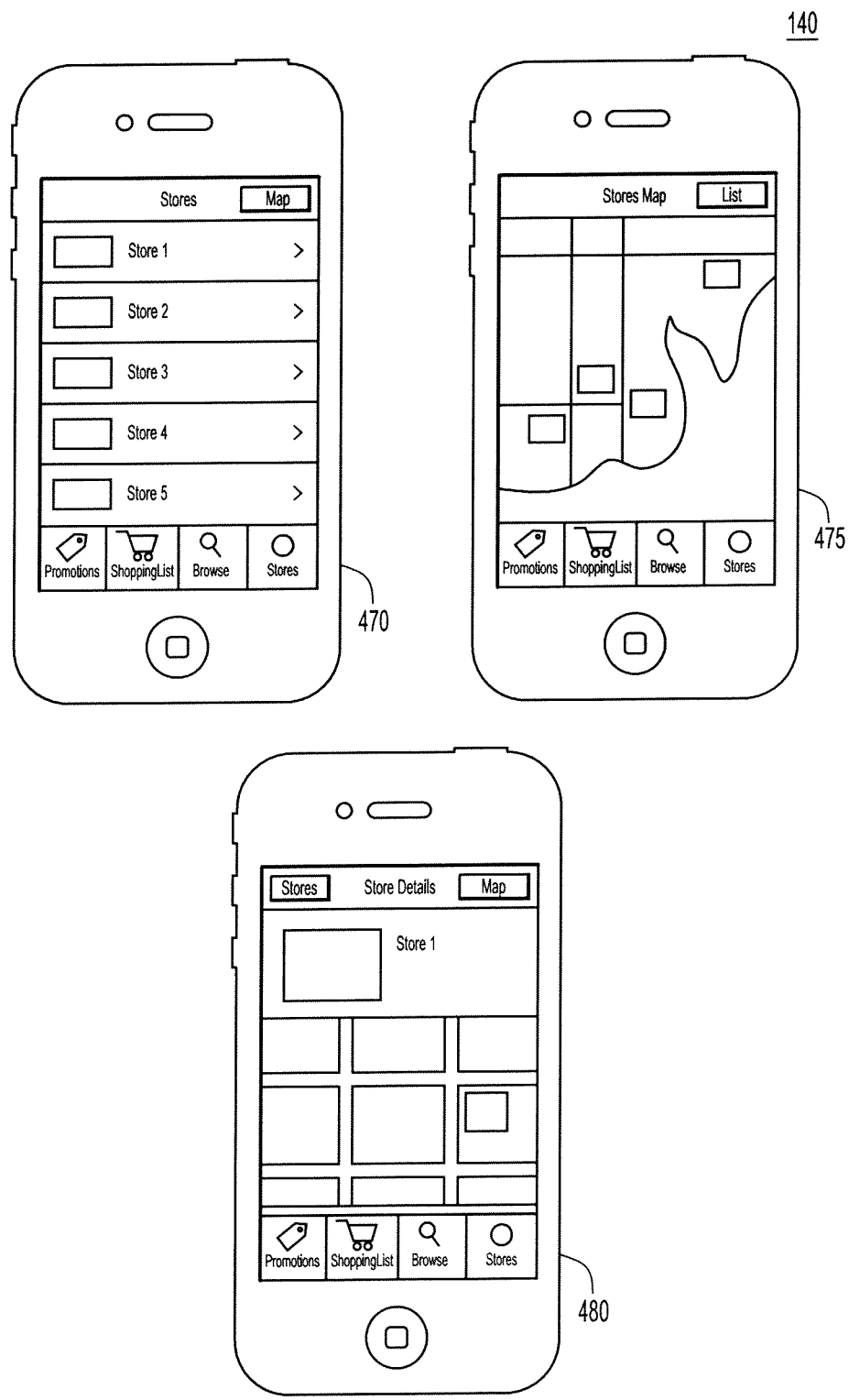

A store finder, corresponding to the "StoreLocator" Functional Module is shown in FIG. 4d, wherein a user may be able to search for nearby stores or search by address, and view sorted results in a list view 470. The user may also be able to see a map view which displays store results 475. The user may finally be able to view a map detail view 480 by selecting a store, which simultaneously displays store information and the map location. If there is only one store in the search results, the map detail view 480 will be displayed immediately.

As previously indicated, an application developer may optionally tweak, alter, override, extend, etc. these modules, including changing the screen hierarchy at a root level, intermediate levels, at a product list level, or a product detail level.

Other Built-in Functional Modules may include a User Account Module and a Home Screen Module. The User Account Module allows a user to edit account related attributes, including password, delivery address, credit card information, etc. Other information such as a user's personal information, purchase history and preferences can be stored and displayed. The Home screen module controls the display of application 140 immediately after a user starts the application. The Home screen may contain views of other modules. For example, it may have a textbox to search the Catalog module. There may be images of various promotions from the HotDeals module.

As mentioned above, the application developer may employ several lines of source code to execute the application 140. Such code may comprise, for example:

var app=new $MA.Template( );
app. start("myserver/myretailApp.xml");

Other programming languages to execute this feature would be obvious to a person of ordinary skill. The creation of this code may also happen via GUI.

Figure 5:
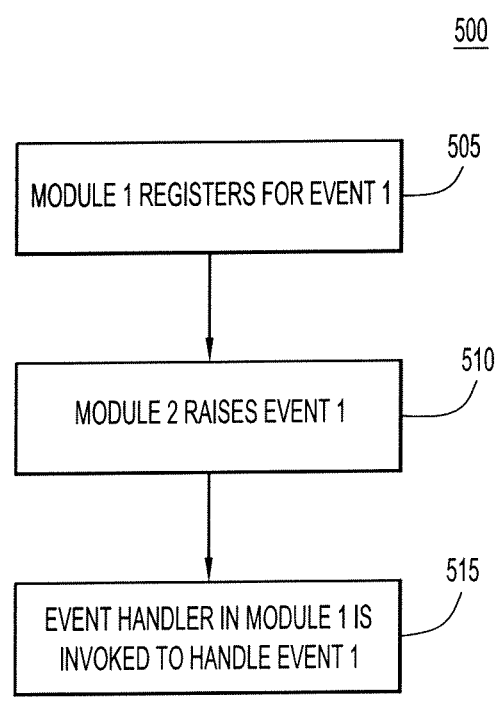
FIG. 5 is an example flow chart showing event registration by modules of the extendable base application and subsequent event handling.

FIG. 5 shows a series of steps 500 by which a Functional Module may register to receive an event that is raised in another Functional Module. At 505, a first module may register to receive a first event. At 510, a second module may then raise that event, causing the relevant event handler in the first module to be invoked at 515. The EBA 220 contains default event handling. For example, the first module at 505 may register with EBA 220 to receive the first event. The EBA 220 may receive various events as they are raised at 510, and then distribute them to event handlers of the registered Functional Modules at 515. Event handling is one mechanism by which Functional Modules can communicate, either directly or via the EBA 220.

As an example with the TestShopping application 140, a ShoppingCart module may register with EBA 220 its interest in receiving all events triggered when the "Add to Shopping Cart" button is selected in a list of products or services. Another module, perhaps the Catalog, may raise the event after a user selects the "Add to Shopping Cart" button. The EBA 220 may then invoke the event handler for the ShoppingCart module, possibly passing the event handler and various data elements associated with the event, thus allowing the correct product or service to be added to the shopping cart.

Default event handling of the EBA 220 may also be modified, overridden, extended, etc. in, for example, Adaptor files that define Custom Behaviors 215, as previously mentioned. As an application developer crafts a new CFM, he or she may define one or more new events and provide handling code, logic, etc. to support the handling of such events. Subsequent versions of the EBA 220 may also define new events and event handlers. Not all events are necessarily passed to a Functional Module, however. For example, for certain GUI elements (e.g. title bar, menu option selections, etc.), a Functional Module may raise an event (e.g. a request to alter a displayed title), and the EBA 220 may handle the event internally without passing it to an event handler of another Functional Module.

CFMs 235, 240 may be configured to expose a minimum API for the EBA 220, and the EBA 220 will call these functions when their associated events are triggered. For example, the function onLeftButtonTapped( ) will be called for a particular Functional Module when a user selects the left button of a mouse in that Functional Module. Similarly onRightButtonTapped( ) will be called when a user selects the right button of a mouse within the Functional Module. Further, getTitleInfo( ) will be called, which allows the application 140 to query the current title caption, left and right button captions. Generally, a Functional Module exposes the API so that an application developer may customize the look and functionality of the application 140. Typically, these attributes can be set via API in the Application Metadata file 205, thus allowing the application 140 to dynamically change the Functional Modules in real time at runtime. With the Shopping Cart Built-in Module, event handlers may include onAddProductToCart( ) which is called when an item is added to the shopping cart, onItemChanged( ) when item quantity is increased or decreased in the shopping cart, and onShowProductDetail( ) when an action to show a product detail is initiated. As previously mentioned, these default event handlers may be overridden or modified with custom event handlers to achieve desired behavior.

To list a few examples, events may include captionChange, when the title of a screen needs to change, leftButtonCaptionChange, when the left button caption needs to be changed, and rightButtonCaptionChange, when the right button caption needs to be changed.

FIG. 6 shows a portion of a CSS file 600 that defines at least part of the appearance of the application 140 on a user display. The EBA 220 may have a default CSS file that gives the application 140 a default appearance, which can then be modified by the application developer to form Custom Styles 210. Functional Modules may also reference CSS file 600. Thus, when a user modifies the CSS file 600 either manually or via GUI, the appearance of all Functional Modules may be simultaneously and similarly updated. This allows the application developer to brand or "skin" the application in many respects, including colors and images of different GUI regions, and layouts of different Functional Modules, etc. Various style elements such as, for example, layout, position, color, size, depth, font, etc. may be added, modified and deleted. While a CSS file is used in this example, it will be apparent to one of ordinary skill in the art that numerous alternative formats are possible.

Figure 7:
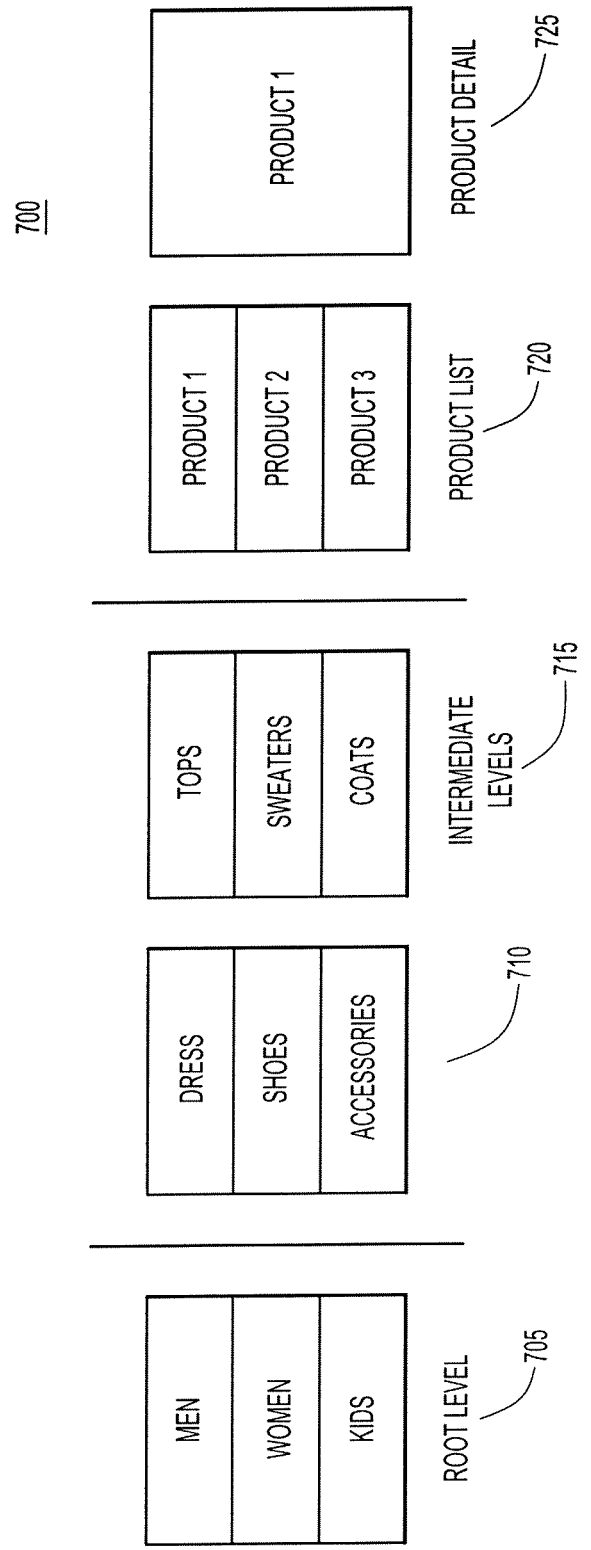
FIG. 7 is a diagram showing an example of several application menus that may be generated by the extendable base application.

Turning now to FIG. 7, a simplified example is given of how an application developer can control the Catalog Built-in Functional Module to realize a series of hierarchical menus as shown in FIG. 4*a*, e.g., at 405 and 410. A root level 705 may list, store, etc. various categories, names, etc., or offered products and services. Each entry may have a name, description, image, identifier, etc. If a root level option is selected, the screen may be updated to the associated intermediate level 710, 715. The intermediate level(s) may list, store, etc., various subcategories of products and services. For example, under the root level category "women," subcategories may include "dresses," "shoes," etc. After possibly traversing one or more intermediate levels, a product list 720 may be displayed listing various products and services. For example, a series of dresses may be displayed in response to the selection of the "dresses" intermediate menu. After an item in a product list 720 is selected, a product detail listing 725 may then be displayed. Each entry may show a name, description, image, identifier, a price, any discounts available, a rating, comments or reviews, availability information, etc. These levels may be defined in layout files either in or referenced by the Application Metadata configuration file 205.

Figure 8:
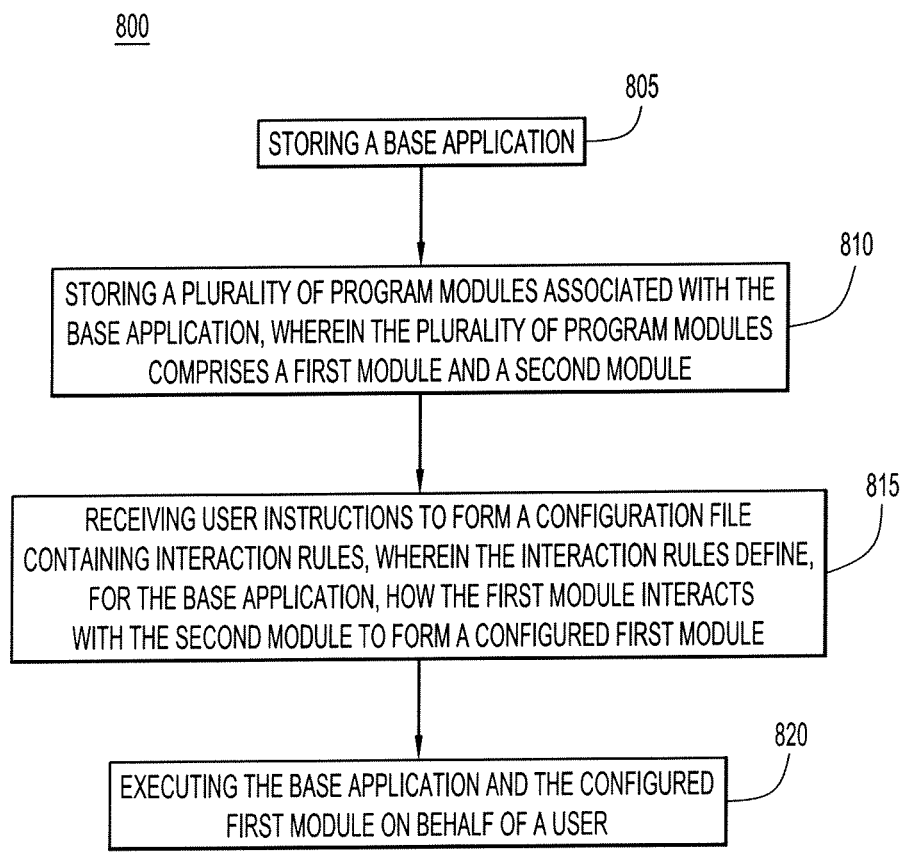
FIG. 8 is an example flow chart depicting operations performed by a device according to techniques presented herein.

In FIG. 8, an embodiment is described in a flow chart, in which a method at 805 stores a base application, and at 810 stores a plurality of program modules associated with the base application, wherein the plurality of program modules comprises a first module and a second module. The method at 815 then receives user instructions to form a configuration file containing interaction rules, wherein the interaction rules define, for the base application, how the first module interacts with the second module to form a configured first module, and executes the base application and the configured first module on behalf of a user.

Figure 9:
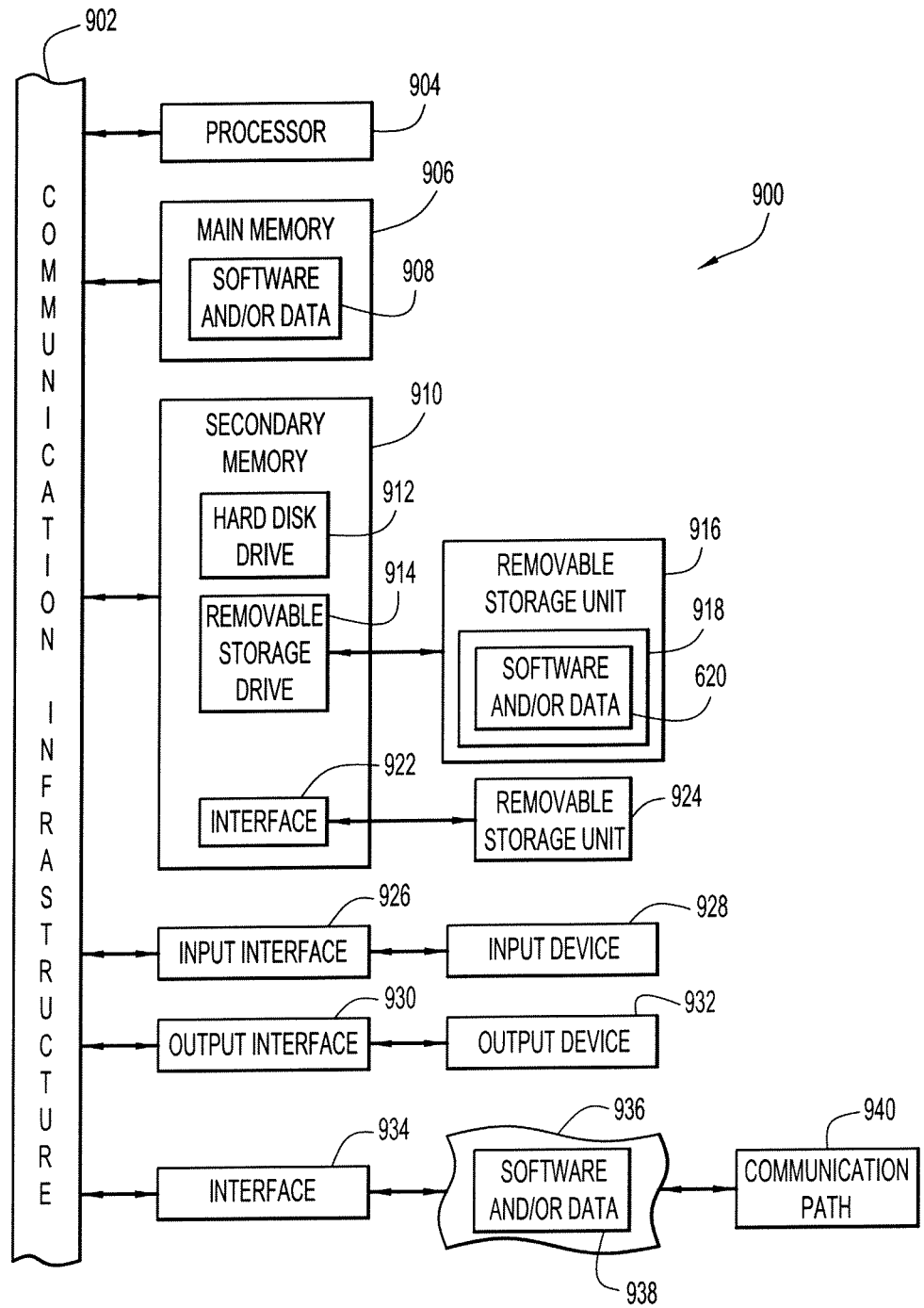
FIG. 9 is an example of a block diagram of a device operable to perform functions of the extendable base application presented herein.

FIG. 9 shows an example system such as server 120 (FIG. 1) upon which an application 140 may be executed. Main Memory 906 and Secondary Memory 910 may comprise read only memory (ROM), random access memory (RAM) that stores software 908, magnetic disk storage media devices 912, optical storage media devices, flash memory devices, electrical, optical, or other physical/tangible memory storage devices, such as removable storage-related devices 914, 916, 918, 920, 922 and 924. The software and/or data 908 may contain instructions implementing any embodiment of this embodiment. Thus, in general, the memory 906, 910 may comprise one or more tangible (non-transitory) computer readable storage media (e.g., a memory device) encoded with software comprising computer executable instructions and when the software is executed (by the processor 904) it is operable to perform the operations described herein, interface 926 with device 928, and/or output 930 with output device 932. The client software and/or data 908 which contains instructions for execution of the present embodiment may be executed on the client device that uses a communication infrastructure 902, but may also be executed on a network 936 executing software and/or data 938, received from a communication path 940 via an interface 934.

In method form, an embodiment comprises storing a base application, and storing a plurality of program modules associated with the base application, wherein the plurality of program modules comprises a first module and a second module. The method also comprises receiving user instructions to form a configuration file containing interaction rules, wherein the interaction rules define, for the base application, how the first module interacts with the second module to form a configured first module. The method further comprises executing the base application and the configured first module on behalf of a user.

An embodiment in the form of a computer-readable storage media comprises computer executable instructions, and when the software is executed operable to store a base application, and store a plurality of program modules associated with the base application, wherein the plurality of program modules comprises a first module and a second module. The software is also operable when executed to receive user instructions to form a configuration file containing interaction rules, wherein the interaction rules define, for the base application, how the first module interacts with the second module to form a configured first module. The software is further operable to execute the base application and the configured first module on behalf of a user.

In apparatus form, an embodiment comprises a memory configured to store client processing logic, and a processor coupled to the memory. The processor is configured to store a base application, and store a plurality of program modules associated with the base application, wherein the plurality of program modules comprises a first module and a second module. The processor is also configured to receive user instructions to form a configuration file containing interaction rules, wherein the interaction rules define, for the base application, how the first module interacts with the second module to form a configured first module. The processor is further configured to execute the base application and the configured first module on behalf of a user.

The above description is intended by way of example only. It will be readily apparent to one of ordinary skill in the art that numerous alternatives are possible. For example, the definition of the B2C application 140 may employ paradigms, techniques, technologies, etc. other than XML. The application 140 may be created by a system administrator, application developer, etc., using a GUI facility, a developer offering What You See Is What You Get (WYSIWYG) capability, an Integrated Development Environment (IDE), APIs, computer code libraries, etc.

Further interactions between data elements, such as between a Wireless Device (WD) and back-end system component described above may optionally contain any combination of information element(s) such as applicable factoid, a piece of product information, advertisements, promotional items, coupons, vouchers, surveys, questionnaires, gift cards, retailer credits, etc. Such material may be selected statically or randomly (from for example a repository of defined material), may be location-based (for example, selected from a pool of available material based on possibly inter alia information about the current physical location of a user's WD, etc.).

The repositories and data stores that were described above may encompass, among other things, any combination of one or more of conventional Relational Database Management Systems (RDBMSs), Object Database Management Systems (ODBMS), in-memory Database Management Systems (DBMS), equivalent data storage and management facilities, etc.

Various interactions that were described above (e.g., between a WD and a back-end system component) may optionally leverage, reference, etc. information on the current physical location of a user's WD as obtained through a one or more of a Location-Based Service (LBS) facility, a Global Positioning System (GPS) facility, etc. to among other things enhance security, provide more applicable or appropriate information, etc.

A Functional Module may optionally reside on, in, etc. any combination of one or more of, inter alia, a WD, a server, a cloud, etc. as either a single entity or as a (e.g., distributed) set of entities.

Various interactions that were described above may employ among other things any combination of one or more of inter alia a (Short Message Service (SMS), Multimedia Message Service (MMS), Internet Protocol (IP) Multimedia Subsystem (IMS), etc.) message exchange, a Wireless Application Protocol (WAP) exchange, a structured or an unstructured data transfer, a data transfer operation atop one or more proprietary or standards-based protocols, an Electronic Message (E-Mail) exchange, an Instant Messaging (IM) exchange, Wi-Fi, a Near Field Communication (NFC) exchange, etc.

The universe of sources from which the EBA 220 and/or a Functional Module may draw, pull, etc. data that is dynamically extensible and may comprise inter alia any combination of one or more of local and/or remote environments.

The specific XML document structure, content, format, etc. that was depicted in FIG. 3 is illustrative only and it will be readily apparent to one or ordinary skill in the art that numerous alternative arrangements, elements, structures, etc. are easily possible.

An application developer may develop a Functional Module themselves and/or retrieve, obtain, etc. a Functional Module from any number of sources including inter alia other developers, from a public source (such as for example the Web, iTunes, Google Play, etc.), from a private repository, etc.

Various materials (such as for example and inter alia Java, JavaScript, CSS files, XML documents, Hypertext Markup Language (HTML) documents, etc.) that may be associated with a feature-rich mobile B2C application 140 as realized by a EBA 220 facility may be generated by, deployed to, executed on, etc. any combination of a WD and/or one or more servers.

What is claimed is:

1. A method comprising:
    storing a base application;
    storing a plurality of program modules associated with the base application, wherein the plurality of program modules comprises a first module and a second module, and wherein each of the first module and the second module is a software extension that adds to or alters a default functionality of the base application;
    receiving user instructions to form a configuration file containing references to additional files that contain program code implementing interaction rules, wherein the configuration file also contains data that defines at least partially an operation of the base application, and wherein:
        the interaction rules define, for the base application, how the first module interacts with the second module to form a configured first module,
        the interaction rules define events triggered by the second module,
        the first module is notified of the events triggered by the second module through a default event handler included in the base application, and
        the interaction rules define event handlers that specify how the first module handles the events triggered by the second module; and
    executing the base application and the configured first module on behalf of a user,
wherein the additional files include functional logic that access data sources, and wherein each of the first and second modules manages its own data, controlling how much data is obtained from the data sources, displayed to a user, updated, and passed to the base application and to each other.

2. The method of claim 1, wherein receiving user instructions comprises receiving instructions for:
    registering the first module with the default event handler of the base application to receive the events triggered by the second module.

3. The method of claim 2, wherein the defined event handlers are included in the first module, and wherein the base application receives the events triggered by the second module and distributes the received events to the defined event handlers.

4. The method of claim 1, wherein one or more of the plurality of program modules are custom modules which have been associated with the base application by the user.

5. The method of claim 1, wherein receiving user instructions comprises receiving instructions for one of:
    detecting that the interaction rules require the first module to directly interact with the second module and, in response, configuring the defined event handlers to directly interact with the second module, wherein the defined event handlers are included in the first module; and
    detecting that the interaction rules require the first module to interact with the second module via the base application and, in response, configuring the defined event handlers to interact with the second module via the base application.

6. The method of claim 1, wherein receiving user instructions comprises:
    receiving instructions from the user via a graphical user interface.

7. The method of claim 1, wherein the configuration file is written in Extensible Markup Language.

8. The method of claim 1, wherein each of the plurality of program modules is selected from a group consisting of a shopping cart, a catalog, a deals module, and a store locator.

9. The method of claim 1, further comprising:
    forming the defined event handlers by modifying the default event handler included in the base application.

10. One or more non-transitory computer readable storage media encoded with software comprising computer executable instructions operable to:
    store a base application;
    store a plurality of program modules associated with the base application, wherein the plurality of program modules comprises a first module and a second module, and wherein each of the first module and the second module is a software extension that adds to or alters a default functionality of the base application;
    receive user instructions to form a configuration file containing references to additional files that contain program code implementing interaction rules, wherein the configuration file also contains data that defines at least partially an operation of the base application, and wherein:
        the interaction rules define, for the base application, how the first module interacts with the second module to form a configured first module,
        the interaction rules define events triggered by the second module,
        the first module is notified of the events triggered by the second module through a default event handler included in the base application, and
        the interaction rules define event handlers that specify how the first module handles the events triggered by the second module; and
    execute the base application and the configured first module on behalf of a user,
wherein the additional files include functional logic that access data sources, and wherein each of the first and second modules manages its own data, controlling how much data is obtained from the data sources, displayed to a user, updated, and passed to the base application and to each other.

11. The non-transitory computer readable storage media of claim 10, wherein the computer executable instructions operable to receive user instructions comprise instructions operable to:
    register the first module with the default event handler of the base application to receive the events triggered by the second module.

12. The non-transitory computer readable storage media of claim 10, wherein one or more of the plurality of program modules are custom modules which have been associated with the base application by the user.

13. The non-transitory computer readable storage media of claim 10, wherein the computer executable instructions operable to receive user instructions comprise instructions operable to one of:
- detect that the interaction rules require the first module to directly interact with the second module and, in response, configuring the defined event handlers to directly interact with the second module, wherein the defined event handlers are included in the first module; and
- detect that the interaction rules require the first module to interact with the second module via the base application and, in response, configuring the defined event handlers to interact with the second module via the base application.

14. The non-transitory computer readable storage media of claim 10, wherein the computer executable instructions operable to receive user instructions comprise instructions operable to:
- receive instructions from the user via a graphical user interface.

15. The non-transitory computer readable storage media of claim 10, wherein the configuration file is written in Extensible Markup Language.

16. The non-transitory computer readable storage media of claim 10, wherein each of the plurality of program modules is selected from a group consisting of: a shopping cart, a catalog, a deals module, and a store locator.

17. An apparatus comprising:
a memory configured to store client processing logic;
a processor coupled to the memory, the processor configured to:
- store a base application;
- store a plurality of program modules associated with the base application, wherein the plurality of program modules comprises a first module and a second module, and wherein each of the first module and the second module is a software extension that adds to or alters a default functionality of the base application;
- receive user instructions to form a configuration file containing references to additional files that contain program code implementing interaction rules, wherein the configuration file also contains data that defines at least partially an operation of the base application, and wherein:
  - the interaction rules define, for the base application, how the first module interacts with the second module to form a configured first module,
  - the interaction rules define events triggered by the second module,
  - the first module is notified of the events triggered by the second module through a default event handler included in the base application, and
  - the interaction rules define event handlers that specify how the first module handles the events triggered by the second module; and
- execute the base application and the configured first module on behalf of a user, wherein the additional files include functional logic that access data sources, and wherein each of the first and second modules manages its own data, controlling how much data is obtained from the data sources, displayed to a user, updated, and passed to the base application and to each other.

18. The apparatus of claim 17, wherein the processor is further configured to:
register the first module with the default event handler of the base application to receive the events triggered by the second module.

19. The apparatus of claim 17, wherein one or more of the plurality of program modules are custom modules which have been associated with the base application by the user.

20. The apparatus of claim 17, wherein the processor is further configured to one of:
- detect that the interaction rules require the first module to directly interact with the second module and, in response, configuring the defined event handlers to directly interact with the second module, wherein the defined event handlers are included in the first module; and
- detect that the interaction rules require the first module to interact with the second module via the base application and, in response, configuring the defined event handlers to interact with the second module via the base application.

21. The apparatus of claim 17, wherein the processor is further operable to:
receive instructions from the user via a graphical user interface.

22. The apparatus of claim 17, wherein the configuration file is written in Extensible Markup Language.

* * * * *